United States Patent
Wong

(10) Patent No.: US 9,619,562 B2
(45) Date of Patent: Apr. 11, 2017

(54) METHOD AND SYSTEM FOR PERFORMING A WEB SEARCH

(75) Inventor: Wai Hung Wong, Sunnyvale, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 268 days.

(21) Appl. No.: 12/827,781

(22) Filed: Jun. 30, 2010

(65) Prior Publication Data

US 2012/0005583 A1    Jan. 5, 2012

(51) Int. Cl.
*G06F 17/30*    (2006.01)

(52) U.S. Cl.
CPC .... *G06F 17/30864* (2013.01); *G06F 17/3089* (2013.01)

(58) Field of Classification Search
CPC ..... G06F 3/0482; G06F 3/0481; G06F 3/0484
USPC ......... 715/738, 850, 854; 709/203, 218, 229
See application file for complete search history.

(56) References Cited

U.S. PATENT DOCUMENTS

| | | | | |
|---|---|---|---|---|
| 5,838,326 A * | 11/1998 | Card | ................... | G06F 3/04815 715/775 |
| 5,847,709 A * | 12/1998 | Card | ................... | G06F 3/04815 715/775 |
| 5,874,954 A * | 2/1999 | Kilmer | ................. | G06F 3/0219 707/E17.111 |
| 5,877,757 A * | 3/1999 | Baldwin | ........... | G06F 17/30882 707/E17.013 |
| 5,877,766 A * | 3/1999 | Bates | .................... | G06F 3/0481 707/E17.013 |
| 6,049,812 A * | 4/2000 | Bertram | ............ | G06F 17/30899 707/999.01 |
| 6,088,032 A * | 7/2000 | Mackinlay | .......... | G06F 3/04815 707/E17.111 |
| 6,204,842 B1 * | 3/2001 | Fujii | .................... | H04N 5/4401 348/E5.108 |
| 7,127,473 B2 * | 10/2006 | Agassi | .............. | G06F 17/30867 |
| 7,451,391 B1 * | 11/2008 | Coleman | ............ | G06F 17/2247 709/224 |

(Continued)

OTHER PUBLICATIONS http://news.yahoo.com/s/nm/20100624/us_nm/us_oil_spill; viewed Jun. 24, 2010.

(Continued)

*Primary Examiner* — David Choi
(74) *Attorney, Agent, or Firm* — James J. DeCarlo; Greenberg Traurig, LLP

(57) ABSTRACT

Disclosed is a method and system for providing to a user rapid access to search resources while interacting with electronic documents by providing for recognition of user initiated search triggers that result in searches being performed with minimal user input or page navigation. The method and system includes generating, by a server computer, a web page, injecting code into the web page, and transmitting the web page to a client computer. The code, when executed on the client computer, detects a search interface trigger occurring during display of the web page, the search interface trigger not associated with an input focus of the web page or of a browser on the client computer, detects a search execution trigger after the detecting of the search interface trigger, and transmits, to a search entity, a request for search results related to content associated with the search interface trigger.

21 Claims, 12 Drawing Sheets

(56) References Cited

U.S. PATENT DOCUMENTS

| | | | |
|---|---|---|---|
| 7,672,932 B2 | 3/2010 | Hood et al. | |
| 7,730,081 B2* | 6/2010 | Bromm | G06Q 10/107 |
| | | | 707/769 |
| 7,853,606 B1* | 12/2010 | Marmaros | G06F 17/30861 |
| | | | 707/769 |
| 8,473,443 B2* | 6/2013 | Lewis | G06Q 10/107 |
| | | | 706/47 |
| 8,601,387 B2* | 12/2013 | Read | G06F 17/30864 |
| | | | 715/780 |
| 2002/0010709 A1* | 1/2002 | Culbert | G06F 17/30876 |
| | | | 715/234 |
| 2006/0129541 A1 | 6/2006 | Morgan et al. | |
| 2007/0011154 A1 | 1/2007 | Musgrove et al. | |
| 2007/0028184 A1 | 2/2007 | Jang | |
| 2007/0055652 A1 | 3/2007 | Hood et al. | |
| 2007/0088687 A1* | 4/2007 | Bromm | G06F 17/30663 |
| 2007/0214119 A1* | 9/2007 | Ray | G06F 17/30864 |
| 2007/0233692 A1 | 10/2007 | Lisa et al. | |
| 2008/0059454 A1 | 3/2008 | Andrieu | |
| 2008/0072179 A1 | 3/2008 | Anwar | |
| 2008/0147653 A1* | 6/2008 | Collier | G06F 17/30864 |
| 2008/0229218 A1 | 9/2008 | Maeng | |
| 2009/0058820 A1* | 3/2009 | Hinckley | G06F 3/017 |
| | | | 345/173 |
| 2009/0094224 A1* | 4/2009 | Ricket | G06F 17/30864 |
| 2009/0144234 A1* | 6/2009 | Sharif | G06F 17/3097 |
| 2009/0240569 A1* | 9/2009 | Ramer | G06F 17/30749 |
| | | | 715/864 |
| 2009/0271388 A1 | 10/2009 | Murdock et al. | |
| 2010/0179958 A1 | 7/2010 | Carr | |
| 2011/0045807 A1* | 2/2011 | Issa | G06Q 10/10 |
| | | | 455/414.1 |
| 2011/0153639 A1* | 6/2011 | Christensen | G06F 17/30864 |
| | | | 707/769 |
| 2011/0246944 A1* | 10/2011 | Byrne | G06F 3/0489 |
| | | | 715/835 |
| 2011/0289066 A1 | 11/2011 | Jaffe et al. | |
| 2012/0005583 A1* | 1/2012 | Wong | G06F 17/30864 |
| | | | 715/738 |
| 2012/0005626 A1* | 1/2012 | Wong | G06F 17/30967 |
| | | | 715/823 |
| 2015/0074561 A1* | 3/2015 | Zhou | G06F 9/4443 |
| | | | 715/760 |

OTHER PUBLICATIONS

Official Action issued in connection with U.S. Appl. No. 12/827,838 mailed May 23, 2012.

Official Action issued in connection with U.S. Appl. No. 12/827,838 mailed Aug. 30, 2012.

http:news//news.yahoo.com/s/nm20100624/us_nm/us_oil_spill; viewed Jun. 24, 2010.

* cited by examiner

METHOD AND SYSTEM FOR PERFORMING A WEB SEARCH

RELATED APPLICATIONS

The present disclosure is related to U.S. patent application Ser. No. 12/827,838 titled Method and System for Performing a Web Search Via A Client-Side Module.

FIELD

The present disclosure relates to searching, and more specifically to a method and system for a compact search on a web page.

BACKGROUND

Web pages often include an input focus in the form of a static search interface at a fixed location (e.g., at the top) of the web page. Such interfaces are also found in browsers. When a user wants to perform a search, the user types text into the search interface and selects a search button or presses a particular key (e.g., the Enter key). If, however, the user is further down on a web page, the user typically has to scroll back to the location (e.g., top) of the web page if the user wants to type an input into the search interface to perform a search, or direct a cursor off the page and enter text into the browser.

SUMMARY

This disclosure relates to providing to the user rapid access to search resources while interacting with electronic documents by providing for recognition of user initiated search triggers that result in searches being performed with minimal user input or page navigation. The disclosure herein relates to initiating search triggers in a manner independent of any pre-programmed web page or electronic document or browser focus area such as a text entry area, embedded link or pre-selected content that is programmed to be user selectable.

In one aspect, a method and system for performing a web search includes generating, by a server computer, a web page, injecting, by the server computer, software code into the web page, and transmitting, by the server computer, the web page to a client computer for display. The injected software code, when executed on the client computer, detects a user-initiated search interface trigger occurring during display of the web page, the search interface trigger not associated with an input focus of the web page or an input focus of a browser on the client computer, detects a user-initiated search execution trigger after the detecting of the search interface trigger, and transmits, to a search entity, in response to the detecting of the search execution trigger, a request for search results related to content associated with the search interface trigger.

In one embodiment, the software code displays a search interface on the web page after the detecting of the search interface trigger. In one embodiment, the software code populates the search interface with content associated with the user-initiated search interface trigger. In one embodiment, the generating of the web page further includes generating a dynamic web page. The software code detecting the user-initiated search interface trigger further includes the software code detecting a user of the client computer selecting text on the web page. In one embodiment, the detecting of the search execution trigger further includes the software code detecting the user of the client computer releasing a button of a cursor control device (e.g., a computer mouse) after selecting text on the web page. In one embodiment, the software code detecting the search interface trigger further includes the software code detecting a selection of a symbol or icon displayed on the web page and associated with the search interface. In one embodiment, the software code detecting the user-initiated search interface trigger further includes the software code detecting a user of the client computer typing text while viewing the web page.

In one embodiment, search suggestions related to the content are transmitted to the client computer during the populating of the search interface with the content. In one embodiment, the software code detects selection of a search suggestion in the displayed search suggestions. In one embodiment, the software code detecting the search execution trigger further includes the software code detecting selecting a search button associated with and displayed with the search interface. In one embodiment, a parameter is received from the client computer, where the parameter restricts operation of the software code. In one embodiment, the user can tailor the search interface and functionality (e.g., only detect the search interface trigger on predetermined web pages and/or only allow the search interface to appear on predetermined web pages).

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 7 is an example of a display screen depicting a web page having a search interface and search suggestions in accordance with an embodiment of the present disclosure;

FIG. 8 is an example of a display screen depicting a web page having a search interface trigger being filled in by a selection of a phrase on the web page in accordance with an embodiment of the present disclosure;

FIG. 9 is an example of a display screen depicting search results in accordance with an embodiment of the present disclosure;

FIG. 10 is an example of a display screen depicting a web page having a client-side module in accordance with an embodiment of the present disclosure.

DESCRIPTION OF EMBODIMENTS

Figure 1:
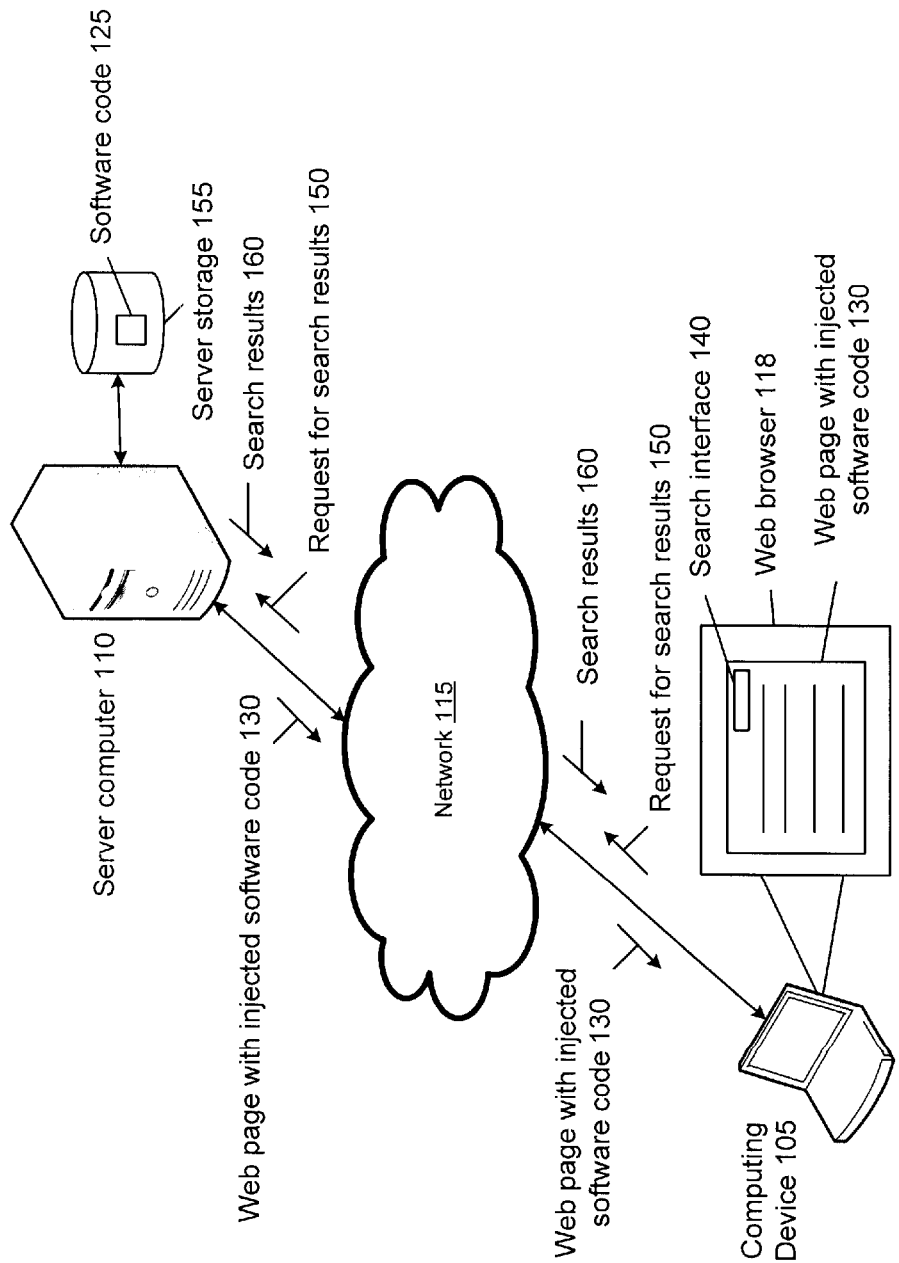
FIG. 1 is a block diagram of a computing device communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Figure 2:
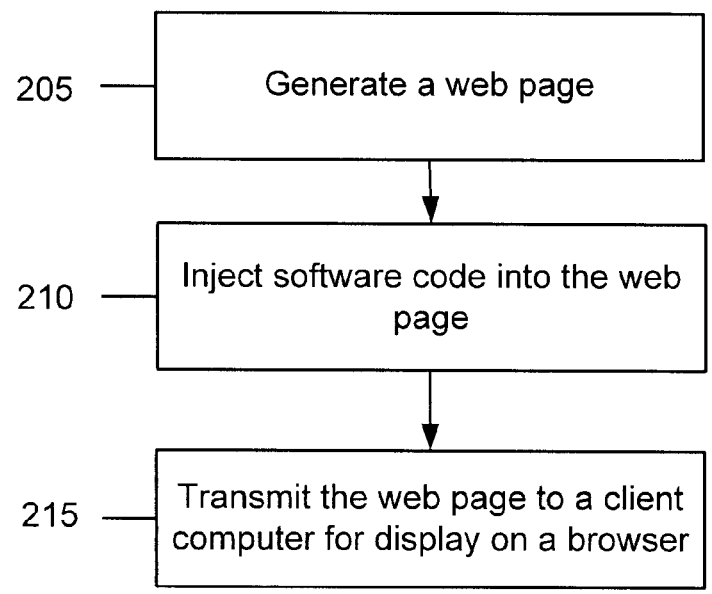
FIG. 2 is a flowchart illustrating the steps performed by the server computer of FIG. 1 in accordance with an embodiment of the present disclosure.

FIG. 1 is a block diagram of an embodiment of a computing device 105 communicating with a server computer 110 over a network 115 such as the Internet. FIG. 2 is a flowchart illustrating an embodiment of the steps performed by the server computer 110. The server computer 110 serves a web page to the computing device 105 in response to a request by the computing device 105 for the web page. The computing device 105 uses a web browser 120 to display the web pages. As is known in the art, web pages, electronic documents, and web browsers may contain an area or portion within which text or other actions may be performed. This is known in the art as an input focus or a focus area, in other words an area that may be selected to receive input or instruction by a user.

In one embodiment, the server computer 110 generates a web page (step 205) requested by the computing device 105. In one embodiment, the server computer 110 injects software code 125 into the web page to create a web page with injected software code 130. In one embodiment, the software code 125 is stored in a server storage 135 such as a database or memory. The server computer 110 transmits the web page with injected software code 130 to the computing device 105 in response to a request for the web page (step 215). The browser 120 then parses and displays the web page with the injected software code 130 and the computing device executes the injected software code 125, using the browser or other programs as needed.

It should be noted that the server computer 110 can itself be or be connected to a search entity, a third party search entity, a third party server computer, the computer that injects the software code 130, the computer that generates the web page, and/or can perform any combination of these functions. Further, the server computer 110 may be one computer or different computers associated with the same or different companies or entities.

Figure 3A:
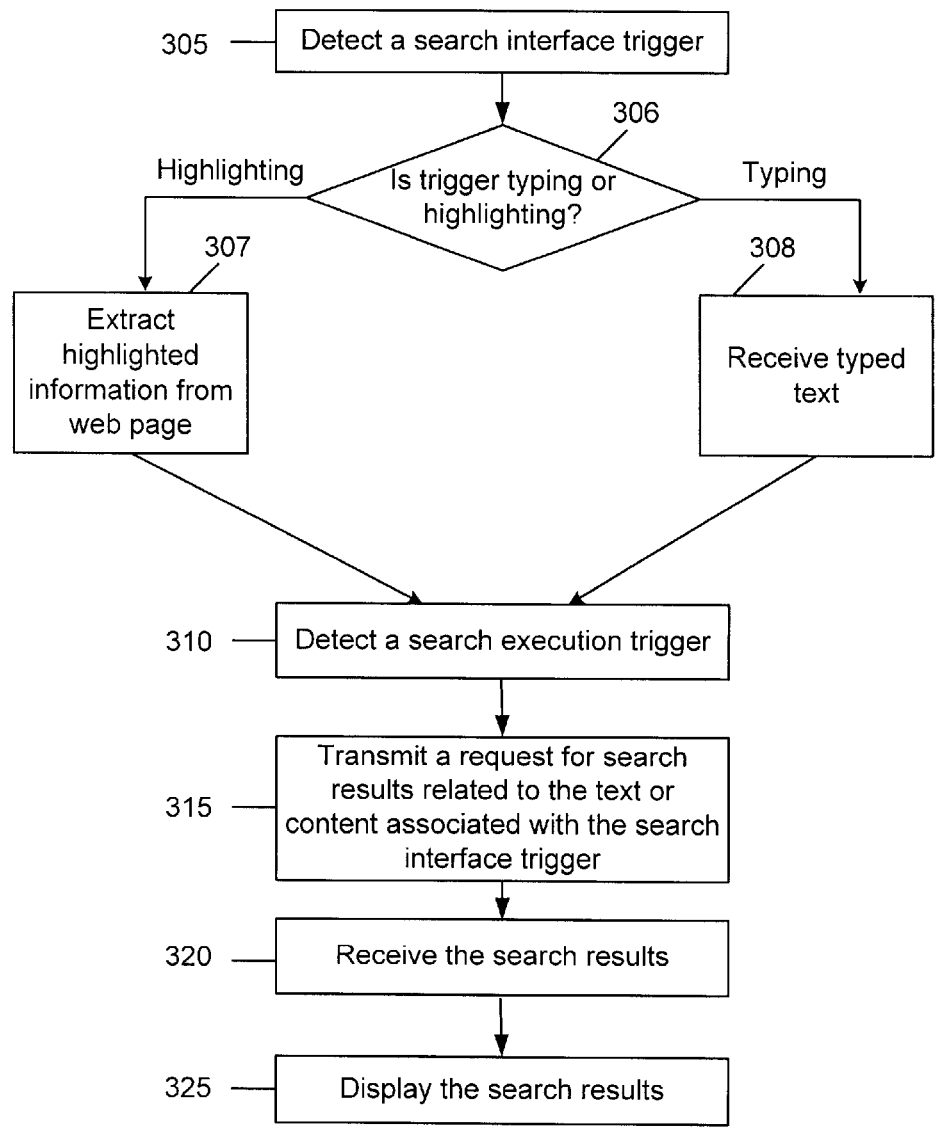
FIG. 3A is a flowchart illustrating steps performed by a client-side module in accordance with an embodiment of the present disclosure.

FIG. 3A is a flowchart illustrating an embodiment of steps performed by the browser 120 when executing the software code 130 associated with the web page. In one embodiment, the web page detects a user-initiated search interface trigger occurring at a location on the web page (Step 305). As used herein, examples of user-initiated search interface triggers include, but are not limited to: the user pressing keyboard buttons to spell a word or phrase (typing); the user clicking on a particular button or symbol (e.g., a [+] sign) displayed by the software code 125 on the web page being viewed; the user highlighting or selecting text via the user's mouse e.g., the user presses the left mouse button and then moves the cursor over desired text or on items on the page; the user pressing a predetermined function key (e.g., the Control key or F1 key), interacting with a touch screen, or other user input techniques. The disclosure herein relates to initiating search triggers in a manner independent of any pre-programmed web page or electronic document or browser focus area such as a text entry area, embedded link or pre-selected content that is programmed to be user selectable. The location on the web page at which the user is initiating this search interface trigger is not an input focus of the web page or an input focus of the browser 120, i.e., is not an input box of the web page 130 or browser 120, therefore permitting the user to initiate a search function at any location on a web page, without the need to scroll to a specific input box or browser or focus area of the page or browser.

In one embodiment, the web page determines if the trigger is typing or highlighting in step 306. If the trigger is highlighting, the web page extracts the highlighted information (Step 307). If the trigger is typing, the web page receives the typed text string (Step 308). In one embodiment, the web page then detects a user-initiated search execution trigger (Step 310). For example, the user-initiated search execution trigger can be the user hitting the Enter key upon completion of typing the desired text string or, if highlighting, the release of a mouse or pointing device button or appropriate touchscreen gesture, touchpad gesture, or cursor control button, after highlighting. This causes the computing device 105 to request search results 150 related to the search term (Step 315) from a search site on the Internet, which could be the server computer 110 or a different search engine site. The server computer 110 generates the search results and transmits the search results 160 to the computing device 105. The computing device 105 receives the search results (Step 320) and displays the search results (Step 325) using the browser 120. In one embodiment, the browser 120 displays the search results on a separate web page. Alternatively, the browser 120 displays the search results in a sidebar.

In one embodiment, the search interface trigger is associated with text. The search interface trigger can be, however, associated with any content, such as images, photographs, advertisements, map location or any other content displayed or displayable on a web page.

Figure 3B:
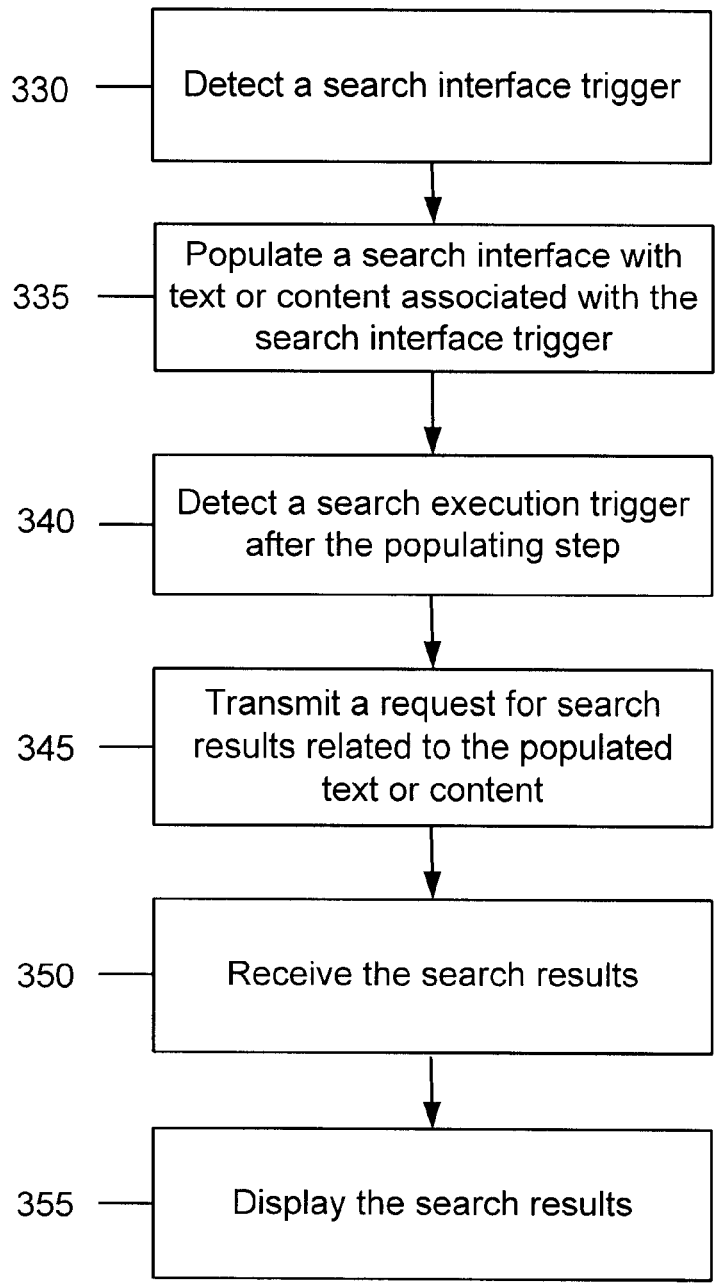
FIG. 3B is a flowchart illustrating steps performed by a client-side module in accordance with an embodiment of the present disclosure.
Figure 4:
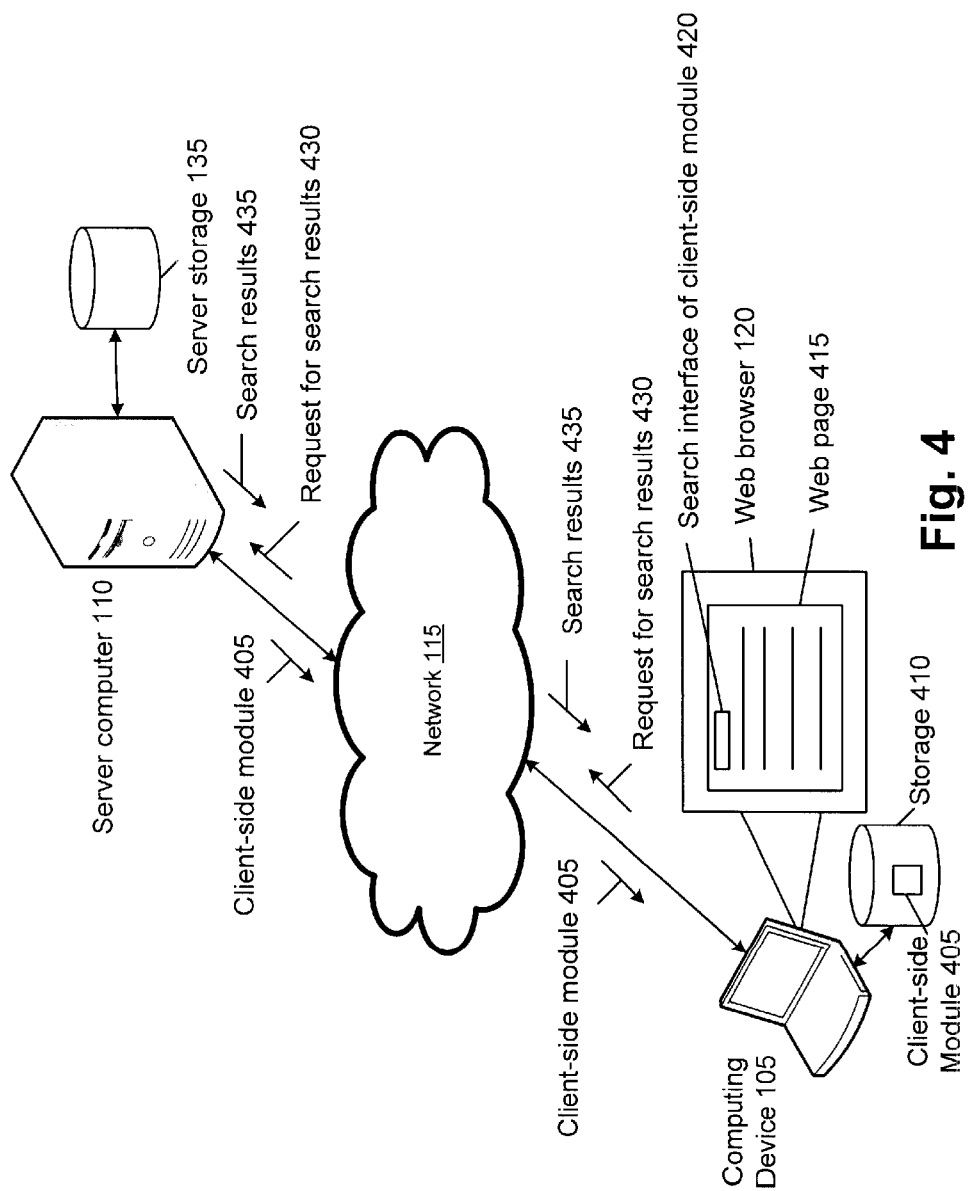
FIG. 4 is a block diagram of a client-side module being transmitted from the server computer of FIG. 1 in accordance with an embodiment of the present disclosure.

FIG. 3B is a flowchart illustrating an embodiment in which steps are performed by the browser 120 when executing the software code 130 associated with the web page. In one embodiment, the web page detects a search interface trigger (Step 330). In one embodiment, once the search interface trigger is detected in Step 330, a search interface 140 appears on the web page 130 and is populated with text or content associated with the search interface trigger (Step 335). For example, suppose the user of the computing device 105 is reading the content of a web page 130 and scrolls down to the bottom of the web page 130 to finish reading the article. While reading the last paragraph of the web page 130, the user comes across a term about which the user desires to find out more information. Without scrolling back up to the top of the web page 130 (where there is a search interface), the user instead merely generates a search interface trigger or search term entry by either typing the term or selecting or highlighting the term with the mouse. In one embodiment, once this search interface trigger is detected, the software code 125 displays a search interface 140 on the web page 130 and populates the search interface 140 with the associated typed or highlighted or selected term. In another embodiment, a search is automatically performed after detecting the search term entry without the display of a search interface.

As another example, in accordance with one or more embodiments, a selectable symbol or icon (shown in the figures herein, by way of non-limiting example, as a plus sign ([+]) may be displayed at some location on the web page 130. Selection of the symbol or icon causes a search interface to be displayed in the current display area of the displayed web page 130, without needing to scroll up to view the search interface at the top of the page or other non-displayed location. The user then types in terms to be searched. In one embodiment, the displayed selectable symbol (e.g., [+]) may "float" above any location on a web page and remain so located as the user scrolls up or down (or side to side) the web page. For example, if the symbol is initially located at the top of the web page, and if the user scrolls down the web page, the symbol remains fixed so that it remains displayed at the top of the displayed portion of the web page. Thus, the user would not have to scroll back up the web page to click on this symbol because it remains stationary on the display regardless of scrolling of the page.

The software code 125 then detects a search execution trigger (Step 340)—the user hitting the Enter key (return) or selecting a Search button associated with the search interface 140. Alternately, if highlighting, the release of a mouse or pointing device button after highlighting could be the search execution trigger. This causes the computing device 105 to request search results 150 related to the search term (Step 345) from a search site on the Internet, which could be the server computer 110 or a different search engine or site. The server computer 110 generates the search results and transmits the search results 160 to the computing device 105. The computing device 105 receives the search results (Step 350) and displays the search results (Step 355) using the browser 120. In one embodiment, the browser 120 displays the search results on a separate web page. Alternatively, the browser 120 displays the search results in a sidebar, child window, or a different browser tab.

In another embodiment, a client-side module 405 performs the functions described above with respect to the injected software code 125. The client-side module 405 enables this functionality to be available on any web page to which the user navigates.

Examples of a client-side module 405 include a modified browser (e.g., Browser Plus™ developed by Yahoo! Inc.), a native or downloaded toolbar, a plug-in, an ActiveX control, a sidebar, or any type of executable coding technique that might be used on a computing device to control and detect the actions described herein. The client-side module 405 may be written in, for example, JavaScript or may be compiled code. In one embodiment, the server computer 110 transmits a client-side module 405 to the computing device 105. In one embodiment, the computing device 105 stores the client-side module 405 in a storage 410 such as a memory. The user of the computing device 105 uses the browser 120 to navigate to a particular web page 415 or document. In one embodiment, the client-side module 405 automatically causes a search interface 420 to be displayed on the web page 120. For example, the client-side module 405 may be displayed as a toolbar search box on the browser 120. Therefore, this search capability is available on any web page navigated to by the user or other document. When a search interface trigger occurs (e.g., the user types or highlights a term while viewing a portion of a web page), the term is automatically entered into the search interface 420. When the user hits Enter or causes the execution of any other type of search execution trigger as set forth herein or otherwise contemplated, a request for search results 430 is transmitted to the server computer 110. The server computer 110 then transmits search results 435 to the computing device 105 for display on the browser 120.

Although the user-initiated search interface trigger is described as being associated with a web page, the client-side module 405 may also detect the user's interactions with any document or content displayed, in other words the functions and features herein are not limited to web pages but to any document or content that may be displayed to a user or a computing device. For example, if a user is viewing a document via a word processor or a non-editable portable document format (PDF) document, the user can initiate a search interface trigger related to, for example, a selected word or term in the document. The client-side module will then perform the functions described herein to conduct a search of the selected word or term by, e.g., opening a browser window and displaying search results associated with the search, or in any other manner described herein.

In one embodiment, as the user is typing in text or selecting a term (i.e., as a search interface trigger is occurring), search suggestions or recommendations appear (e.g., below the search interface 420). In one embodiment, the browser 120 is transmitting the entered search term to the server computer 110 and the server computer 110 returns search suggestions/recommendations. These search suggestions/recommendations can change as more of the search term or terms are entered/selected by the user.

An embodiment of pseudocode for the steps shown in the example of FIG. 3 is below:

```
Compact_Search_Obj:
    Initialize:
        Listen to Mouse Event
        Listen to Keypress Event
    If Keypress Event Triggerred
        If the Focused Element is Not other Input (e.g. textbox, textarea, Iframe Content-Editable)
            If Keypressed is not function key
                Show the compact search interface
                Add the Character to the search text box
            Else If Keypressed is Enter and the text box is Not Empty
                Go to Search page
            Else If Keypressed is Esc
                Hide the compact search
                Clear the search text
            Else
                Do Nothing
            End If
        End If
    End If
    If Mouse click Triggerred
        If Click on the compact search [+] sign / the trigger symbol
            Show the compact search
        Else If Click on the compact search wiget (the input box / the button)
            If click on button
                Go to Search page
            End If
        Else If Click anywhere outside the compact search widget
            hide the compact search
        End If
    End If
    If Mouse Select Triggerred
        If Selected Text Found
            Populate the Selected Text to the input in the compact
```

```
        search
            Show the compact search
        End If
    End If
```

An example of an embodiment of pseudocode for the client-side module 405 is below:

```
Toolbar installation:
    Hook into browser events
When browser Start / User load a page:
    Initialize:
        Listen to Mouse Event
        If Selected Text Found
            Populate the Selected Text to the toolbar search input
        End If
```

Figure 5:
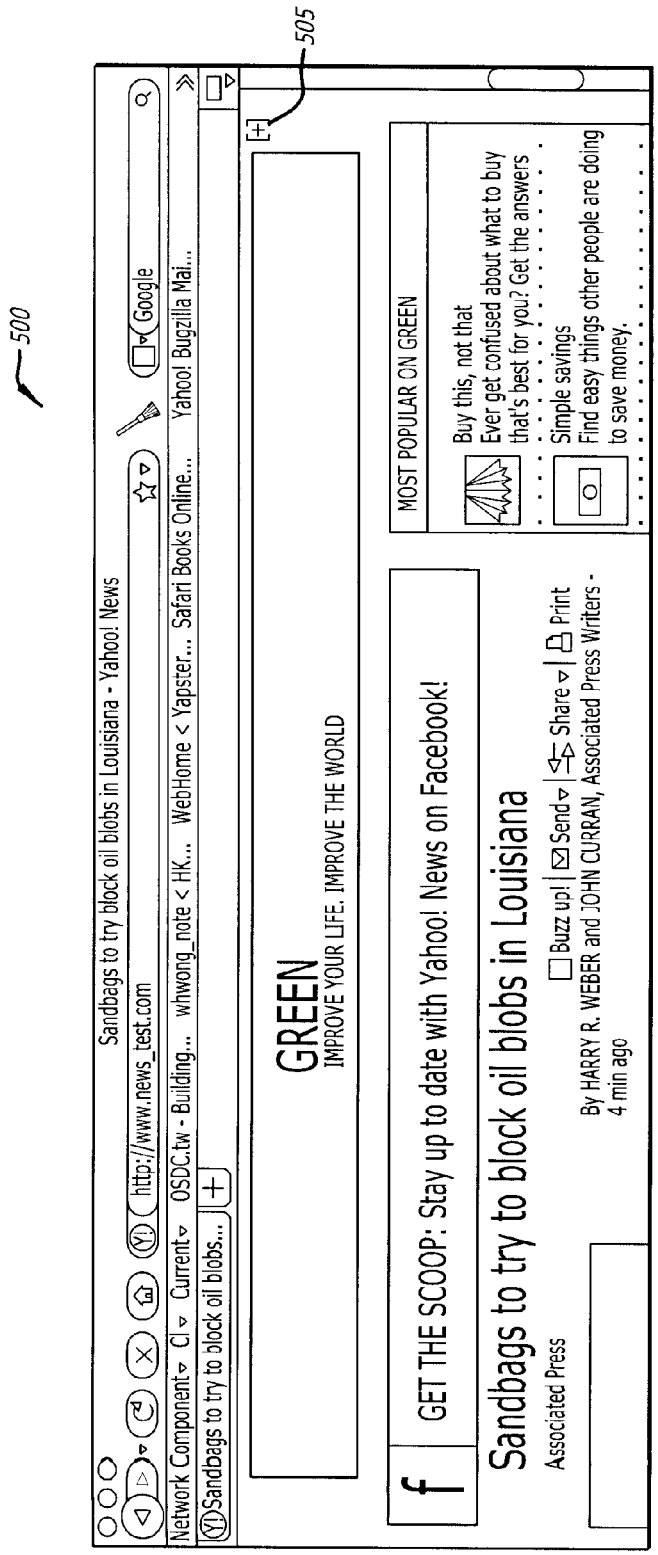
FIG. 5 is an example of a display screen depicting a web page having a search interface trigger in accordance with an embodiment of the present disclosure.
Figure 6:
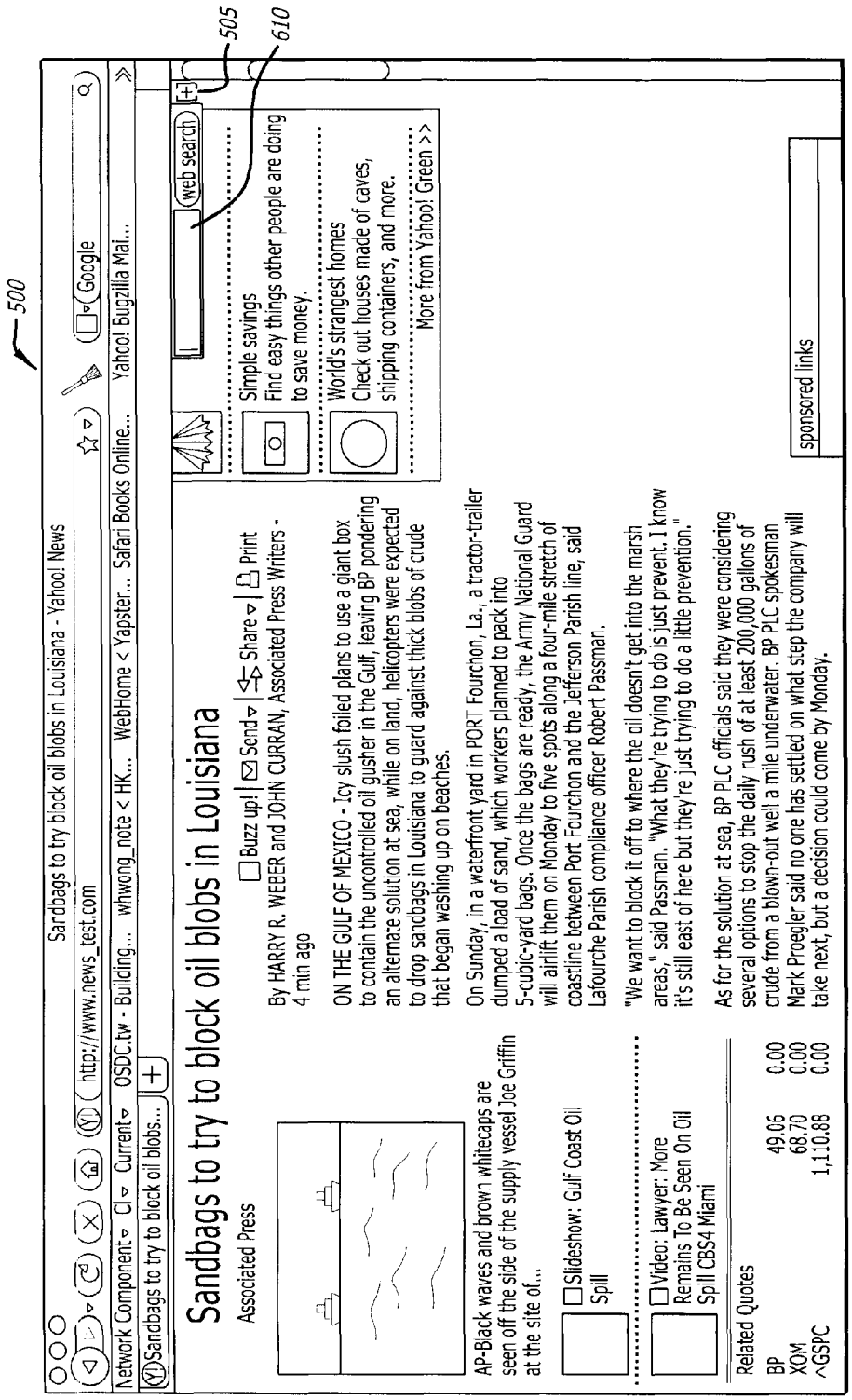
FIG. 6 is an example of a display screen depicting a web page having a search interface in accordance with an embodiment of the present disclosure.

FIG. 5 illustrates the display appearance of a web page 500 having a search interface trigger 505 as a [+] symbol on the top portion of the web page 500. FIG. 6 is an embodiment of the display appearance of the same web page 500 as shown in FIG. 5 (web page 500) but with a search interface 610 being displayed in response to the user selecting the search interface trigger 505. The user can now enter a search term into the search interface 610 while the user navigates to any location on the web page 500.

Figure 7:
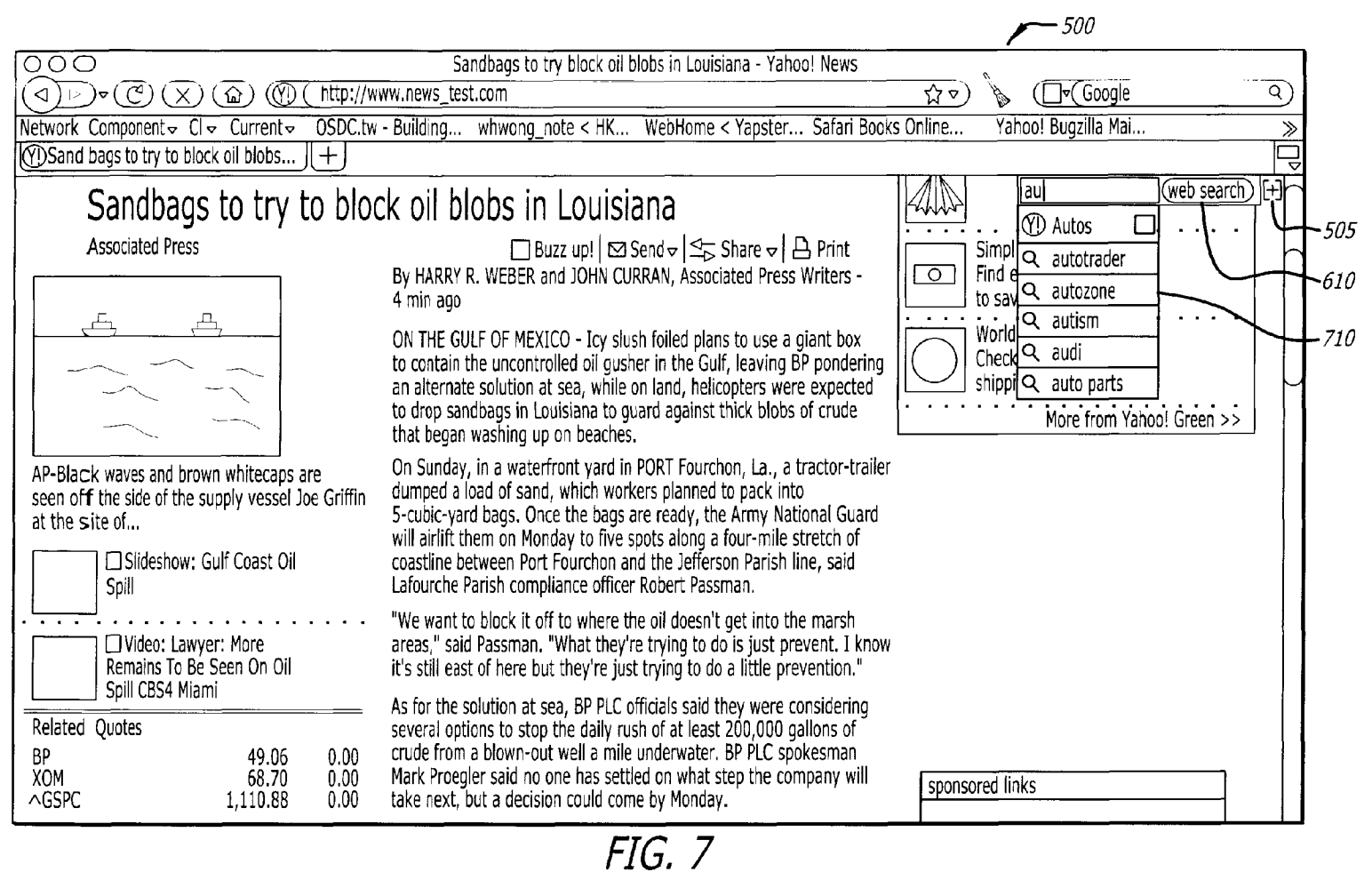

FIG. 7 shows an embodiment of the web page 500 in which the user has typed the text string "au" while viewing the displayed webpage. The user performs this typing without having to have navigated to the search interface window (input focus). In other words, while browsing, and regardless of cursor position, the user may start to type, and this is detected as a search interface trigger. Search recommendations 710 are displayed in response to the receipt of the search term "au". Thus, a "speculative" or predictive search result (one or more search recommendations) for a search query or term is provided prior to finalization of the search query. The speculative search result is provided to the user for the not-yet-submitted search query prior to receiving an indication from the client node that the search query is completely formed, i.e., prior to detecting the search execution trigger. As the use continues to formulate the search query, a new speculative search result may be provided to the user. One such technique of predictive or speculative search recommendation is described in U.S. Pat. No. 7,672,932.

Figure 8:
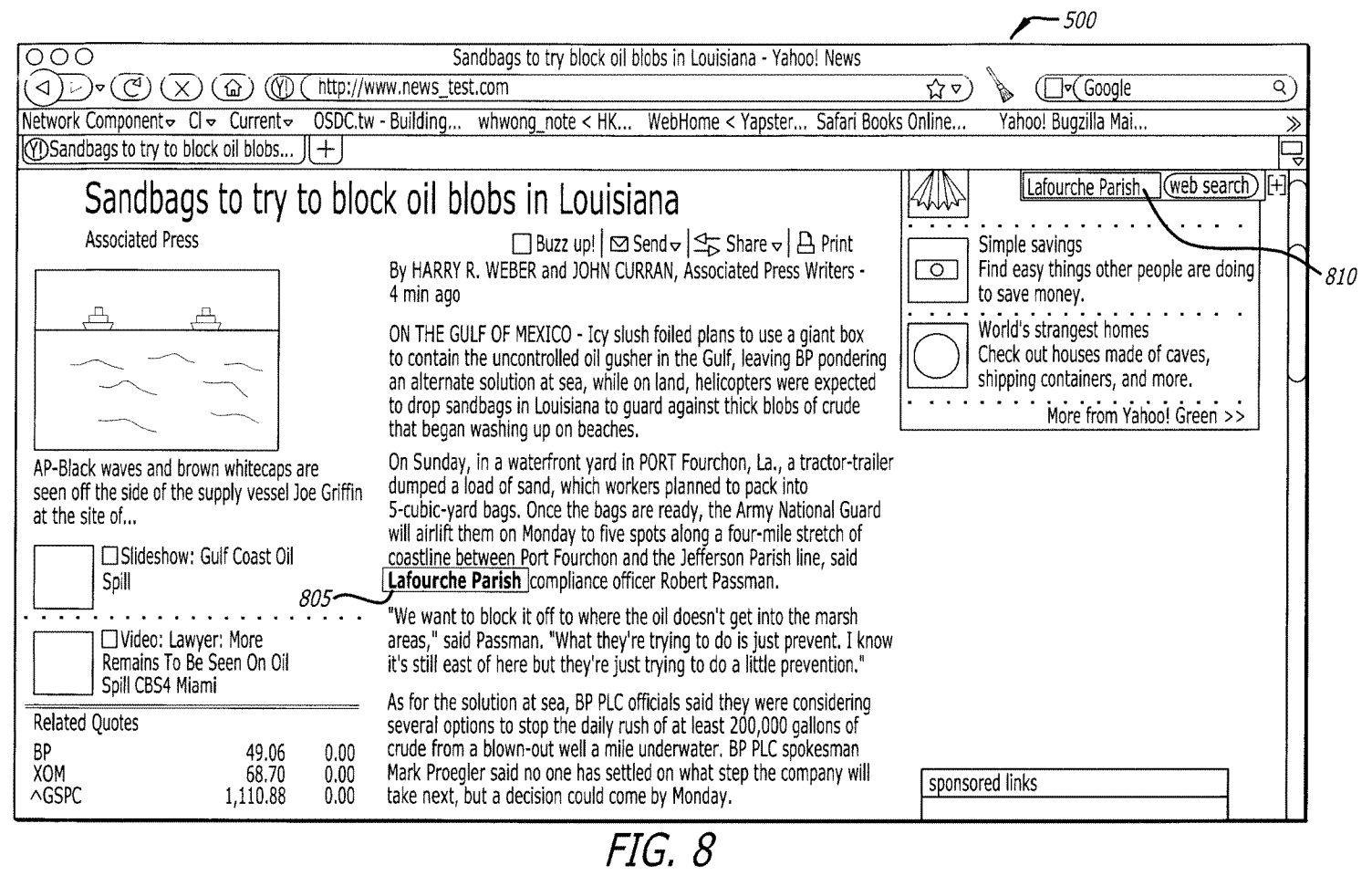
Figure 9:
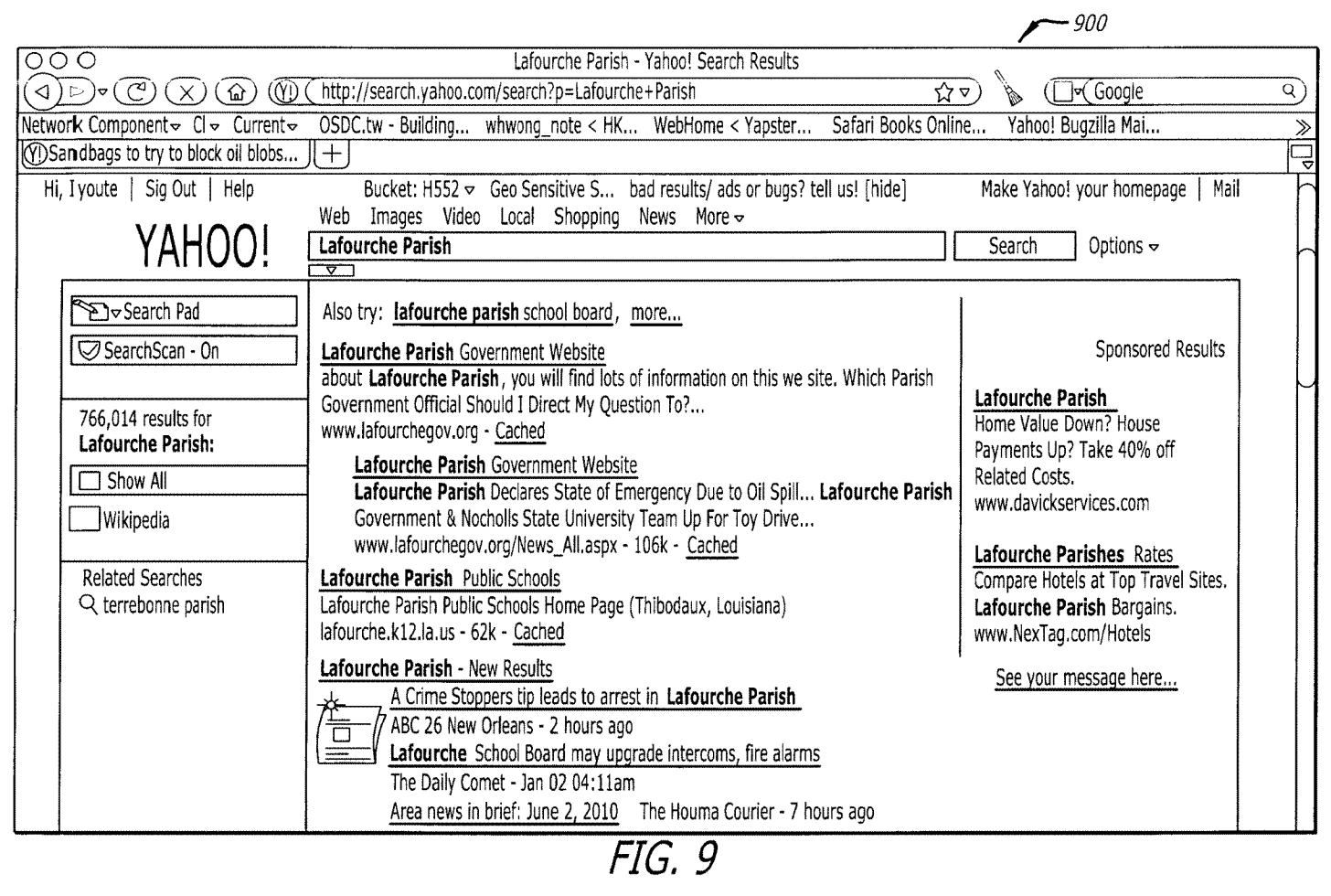

FIG. 8 is an embodiment of the web page 500 in which the user has selected a phrase "Lafourche Parish" 805 using the mouse. The selection of the phrase 805 is a search interface trigger and, as a result of the selection, the phrase 805 is automatically provided as input to the search interface 810. In other words, while browsing, the user may highlight, and this is detected as a user-initiated search interface trigger. The user then performs a search execution trigger, which can be, for example, selecting the "web search" button to the right of the search interface 810 or by hitting the Enter key. FIG. 9 shows an embodiment of search results 900 for the phrase 805.

Figure 10:
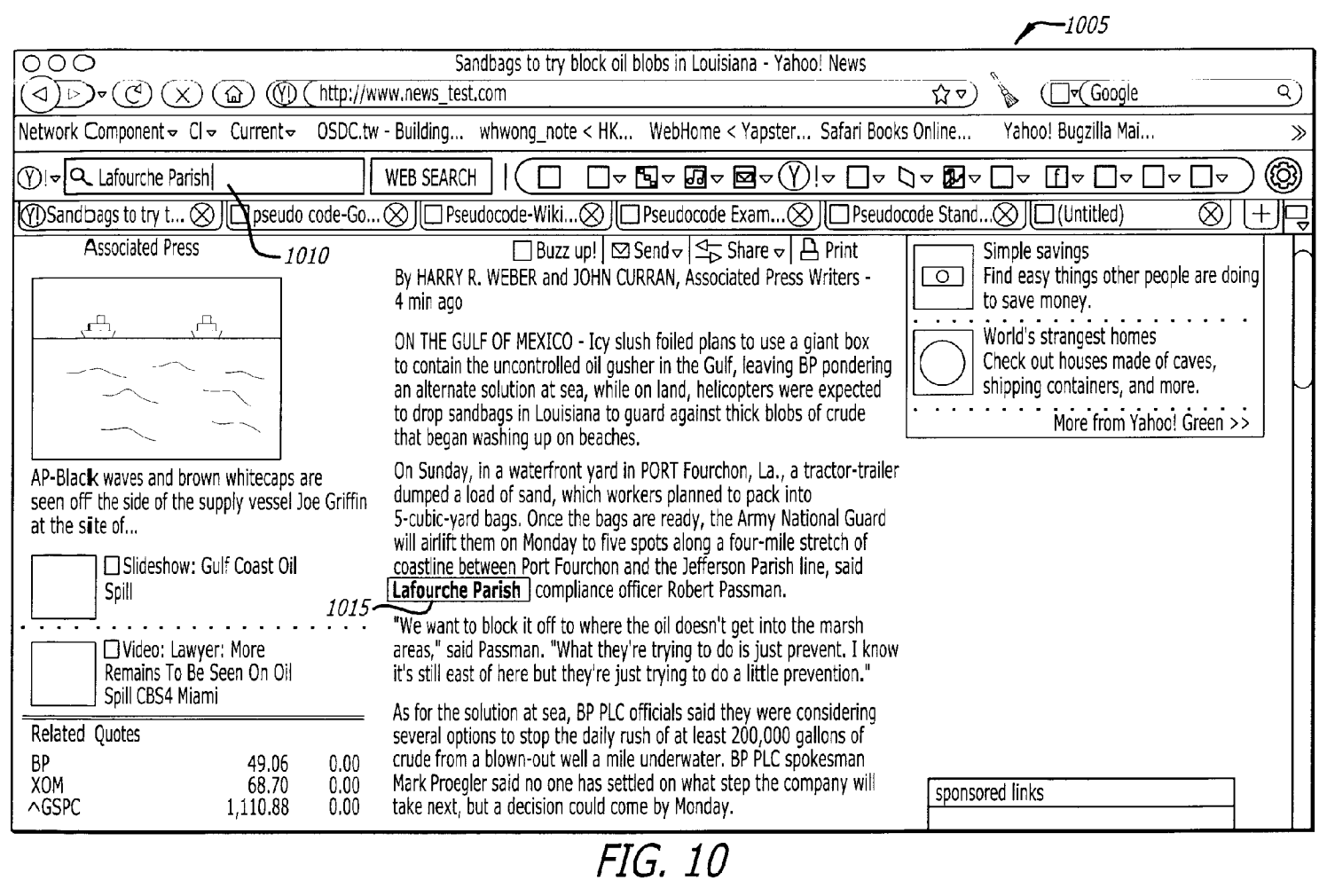

FIG. 10 is an embodiment of a web page 1005 having a client-side module 1010. In the embodiment shown, the client-side module 1010 is a toolbar. The user selects a phrase 1015 on the web page 1005 and, once the selection is complete, e.g., the user releases the mouse button or if using the Shift and arrow keys when the Shift key is released, the phrase is automatically input into the toolbar search window 1010 or just sent to the desired search location.

In one embodiment, the client-side module 405 enables restrictions to be placed on the search interface and/or search functionality. In one embodiment, the user can turn on or off the search interface and functionality described herein. In another embodiment, the user can tailor the search interface and functionality (e.g., only detect the search interface trigger on predetermined web pages and/or only allow the search interface 420 to appear on predetermined web pages).

Figure 11:
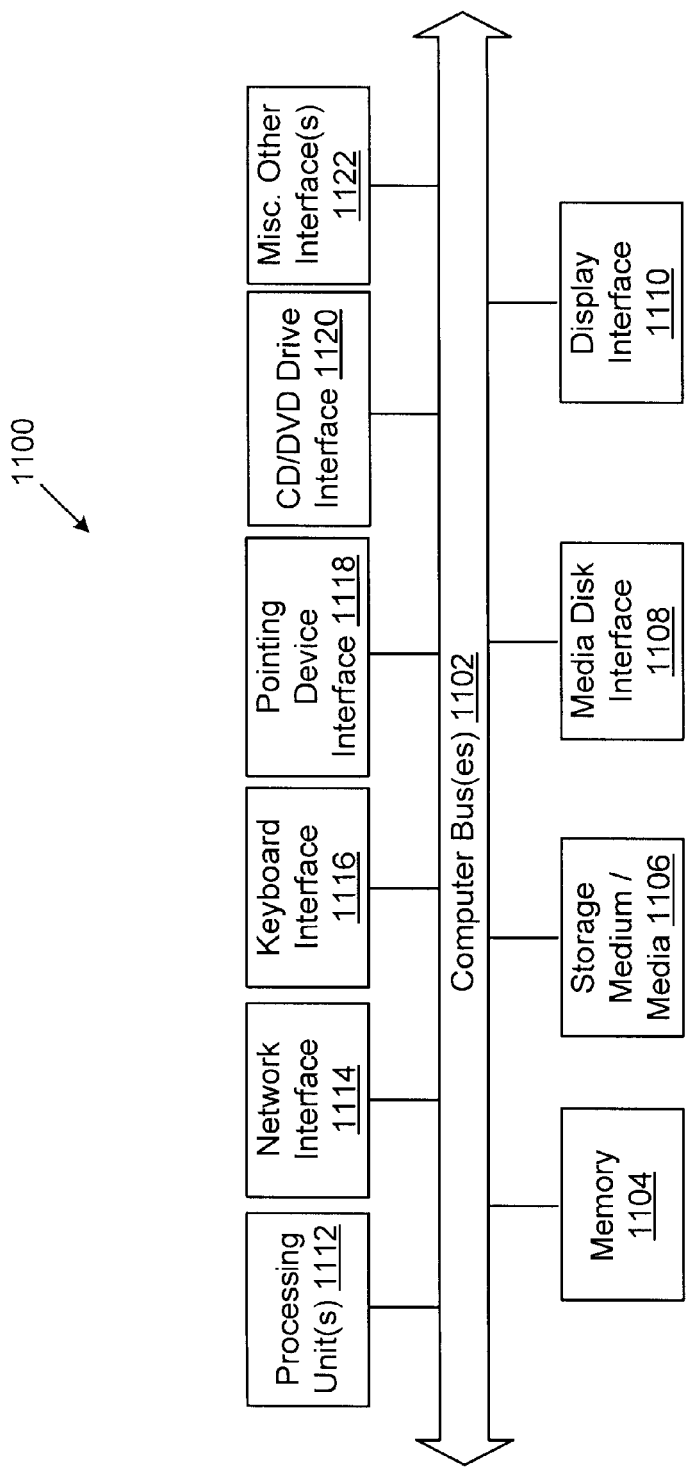
FIG. 11 is a block diagram illustrating an internal architecture of a computing device in accordance with an embodiment of the present disclosure.

FIG. 11 is a block diagram illustrating an internal architecture of an example of a computing device, such as server computer 110 and/or computing device 105, in accordance with one or more embodiments of the present disclosure. A computing device as referred to herein refers to any device with a processor capable of executing logic or coded instructions, and could be a server, personal computer, set top box, smart phone, pad computer or media device, to name a few such devices. As shown in the example of FIG. 11, internal architecture 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, playlists and other files. Persistent storage medium/media 1106 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   generating, by a server computer, a web page;
   injecting, by the server computer, software code into the web page, the injected software code comprising instructions for:
   checking that the web page is one of a plurality of user predetermined web pages;
   when the web page is one of the plurality of user predetermined web pages:
      detecting a user-initiated search interface trigger occurring during display of the web page, the user-initiated search interface trigger not associated with an input focus of the web page or an input focus of a browser on a client computer, the detecting of the user-initiated search interface trigger comprising detecting a user of the client computer selecting text on the web page, the detecting further comprising detecting the user selecting text on the web page and detecting the user completing selection of the web page text,
      in direct response to the detecting of the user-initiated search interface trigger, displaying a search interface that receives as input characters of the selected text,
      populating the search interface with content associated with the user-initiated search interface trigger,
      detecting a user-initiated search execution trigger, the search execution trigger comprising the detection that the user has completed selection of the web page text,
      transmitting, to a search entity, in response to the detecting of the search execution trigger, a request for search results related to the content associated with the populating;
   transmitting, by the server computer, the web page with the injected code to the client computer.

2. The method of claim 1 wherein the software code displays the search interface on the web page after the detecting of the user-initiated search interface trigger.

3. The method of claim 1 wherein the generating of the web page further comprises generating a dynamic web page.

4. The method of claim 1 wherein the detecting of the user-initiated search execution trigger further comprises the software code detecting the user of the client computer releasing a mouse button after selecting text on the web page.

5. The method of claim 2 wherein the software code detecting the user-initiated search interface trigger further comprises the software code detecting a selection of an icon displayed along with the web page and associated with the search interface.

6. The method of claim 1 further comprising transmitting, by the server computer to the client computer, search suggestions related to the content during the populating of the search interface with the content.

7. The method of claim 6 wherein the software code detecting the user-initiated search execution trigger further comprises the software code detecting selection of a search suggestion in the displayed search suggestions.

8. The method of claim 1 wherein the software code detecting the user-initiated search interface trigger further comprises the software code detecting selection of a predetermined function key.

9. The method of claim 1 wherein the software code detecting the user-initiated search execution trigger further comprises the software code detecting pressing a predetermined key.

10. The method of claim 1 wherein the software code detecting the user-initiated search execution trigger further comprises the software code detecting selecting a search button associated with and displayed with the search interface.

11. A non-transitory computer readable storage medium tangibly storing thereon computer program instructions capable of being executed by a computer processor, the computer program instructions defining the steps of:
   generating a web page;
   injecting software code into the web page, the injected software code comprising instructions for:
   checking that the web page is one of a plurality of user predetermined web pages;

when the web page is one of the plurality of user predetermined web pages:
  detecting a user-initiated search interface trigger occurring during display of the web page, the user-initiated search interface trigger not associated with an input focus of the web page or an input focus of a browser, the detecting of the user-initiated search interface trigger comprising detecting a user of the client computer selecting text on the web page, the detecting further comprising detecting the user selecting text on the web page and detecting the user completing selection of the web page text,
  in direct response to the detecting of the user-initiated search interface trigger, displaying a search interface that receives as input characters of the selected text,
  populating the search interface with content associated with the user-initiated search interface trigger, the search interface resulting from the detecting of the user-initiated search interface trigger,
  detecting a user-initiated search execution trigger, the search execution trigger comprising the detection that the user has completed selection of the web page text
  transmitting, to a search entity, in response to the detecting of the user-initiated search execution trigger, a request for search results related to content associated with the populating;
and
transmitting the web page with the injected code to the client computer.

12. The non-transitory computer readable storage medium of claim 11 wherein the software code displays the search interface on the web page after the detecting of the user-initiated search interface trigger.

13. The non-transitory computer readable storage medium of claim 11 wherein the software code detecting the user-initiated search execution trigger further comprises the software code detecting the user of the client computer releasing a mouse button after selecting text on the web page.

14. The non-transitory computer readable storage medium of claim 11 wherein the software code detecting the user-initiated search interface trigger further comprises the software code detecting a selection of a button displayed on the web page and associated with the search interface.

15. The non-transitory computer readable storage medium of claim 11 further comprising the step of transmitting search suggestions related to content during the populating of the search interface with the content.

16. The non-transitory computer readable storage medium of claim 15 wherein the software code configured to detect the user-initiated search execution trigger further comprises the software code being configured to detect selection of a search suggestion in the displayed search suggestions.

17. The non-transitory computer readable storage medium of claim 11 wherein the software code configured to detect the user-initiated search execution trigger further comprises the software code being configured to detect pressing a predetermined key.

18. A server computer comprising:
a processor;
a storage medium storing software code comprising
  logic to check that a web page is one of a plurality of user predetermined web pages;
  logic to, when the web page is one of the plurality of user predetermined web pages, detect a user-initiated search interface trigger occurring during display of the web page, the user-initiated search interface trigger not associated with an input focus of the web page or an input focus of a browser, the logic to detect the user-initiated search interface trigger comprising logic to detect a user of the client computer selecting text on the web page, the logic to detect the user selecting the web page text further comprises logic to detect the user selecting text on the web page and logic to detect the user completing selection of the web page text;
  wherein the logic to detect the user-initiated search interface trigger comprises logic to display, in direct response to the detecting of the user-initiated search interface trigger, a search interface that receives as input characters of the selected text,
  logic to populate the search interface with content associated with the user-initiated search interface trigger, the search interface resulting from the detecting of the user-initiated search interface trigger;
  logic to detect a user-initiated search execution trigger, the logic to detect the user-initiated search execution trigger comprising the logic to detect the user completing selection of the web page text
  logic to transmit, to a search entity, in response to the detecting of the search execution trigger, a request for search results related to content associated with the populating;
  the processor generating a web page and injecting the software code into the web page; and
  a network interface transmitting the web page to the client computer.

19. The method of claim 1, further comprising receiving, by the server computer, a parameter from the client computer, the parameter restricting operation of the software code, the parameter indicating the plurality of user predetermined web pages.

20. The non-transitory computer readable medium of claim 11, further comprising receiving a parameter from the client computer, the parameter restricting operation of the software code, the parameter indicating the plurality of user predetermined web pages.

21. The server computer of claim 18, further comprising logic to receive a parameter from the client computer, the parameter restricting operation of the software code, the parameter indicating the plurality of user predetermined web pages.

* * * * *